(12) United States Patent
Schmitz et al.

(10) Patent No.: US 9,359,807 B2
(45) Date of Patent: *Jun. 7, 2016

(54) TRANSPARENT PANEL WITH ELECTRICALLY CONDUCTIVE COATING

(71) Applicant: SAINT-GOBAIN GLASS FRANCE, Courbevoie (FR)

(72) Inventors: Christoph Schmitz, Bornheim (DE); Klaus Fischer, Alsdorf (DE); Sebastian Janzyk, Herzogenrath (DE); Marcus Neander, Eschweiler (DE); Ulrich Billert, La Celle Saint-Cloud (FR); David Luxembourg, Rives (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 97 days.

This patent is subject to a terminal disclaimer.

(21) Appl. No.: 14/358,656

(22) PCT Filed: Oct. 4, 2012

(86) PCT No.: PCT/EP2012/069566
§ 371 (c)(1),
(2) Date: May 15, 2014

(87) PCT Pub. No.: WO2013/104438
PCT Pub. Date: Jul. 18, 2013

(65) Prior Publication Data
US 2014/0362434 A1    Dec. 11, 2014

(30) Foreign Application Priority Data

Jan. 10, 2012   (EP) .................................... 12150547

(51) Int. Cl.
*H05B 3/86*    (2006.01)
*E06B 3/66*    (2006.01)
(Continued)

(52) U.S. Cl.
CPC ............. *E06B 3/66* (2013.01); *B32B 17/10036* (2013.01); *B32B 17/10229* (2013.01);
(Continued)

(58) Field of Classification Search
None
See application file for complete search history.

(56) References Cited

U.S. PATENT DOCUMENTS

| 4,443,691 A | 4/1984 | Sauer |
| 4,902,580 A | 2/1990 | Gillery |

(Continued)

FOREIGN PATENT DOCUMENTS

| DE | 9313394 | 10/1993 |
| DE | 4235063 | 4/1994 |

(Continued)

OTHER PUBLICATIONS

PCT International Search Report mailed on Nov. 23, 2014 for PCT/EP2012/069566 filed on Oct. 4, 2012 in the name of Saint-Gobain Glass France.

(Continued)

*Primary Examiner* — Derek S Chapel
(74) *Attorney, Agent, or Firm* — Steinfl & Bruno LLP

(57) ABSTRACT

A transparent panel is described. The transparent panel has at least one transparent substrate and at least one electrically conductive coating on at least one surface of the transparent substrate. The electrically conductive coating has at least two functional layers which are arranged one above the other, and each functional layer has at least an optically highly refractive material layer, which has a refractive index greater than or equal to 2.1, and a smoothing layer, which is above the optically highly refractive material layer. The smoothing layer contains at least one non-crystalline oxide, a first matching layer, which is above the smoothing layer, an electrically conductive layer, which is above the first matching layer, and a second matching layer, which is above the electrically conductive layers. The total thickness of all the electrically conductive layers is between 40 nm and 75 nm, and the electrically conductive coating has a low ohm/square sheet resistance. The optically highly refractive material contains at least one mixed silicon/metal nitride.

33 Claims, 3 Drawing Sheets

Figure 1:
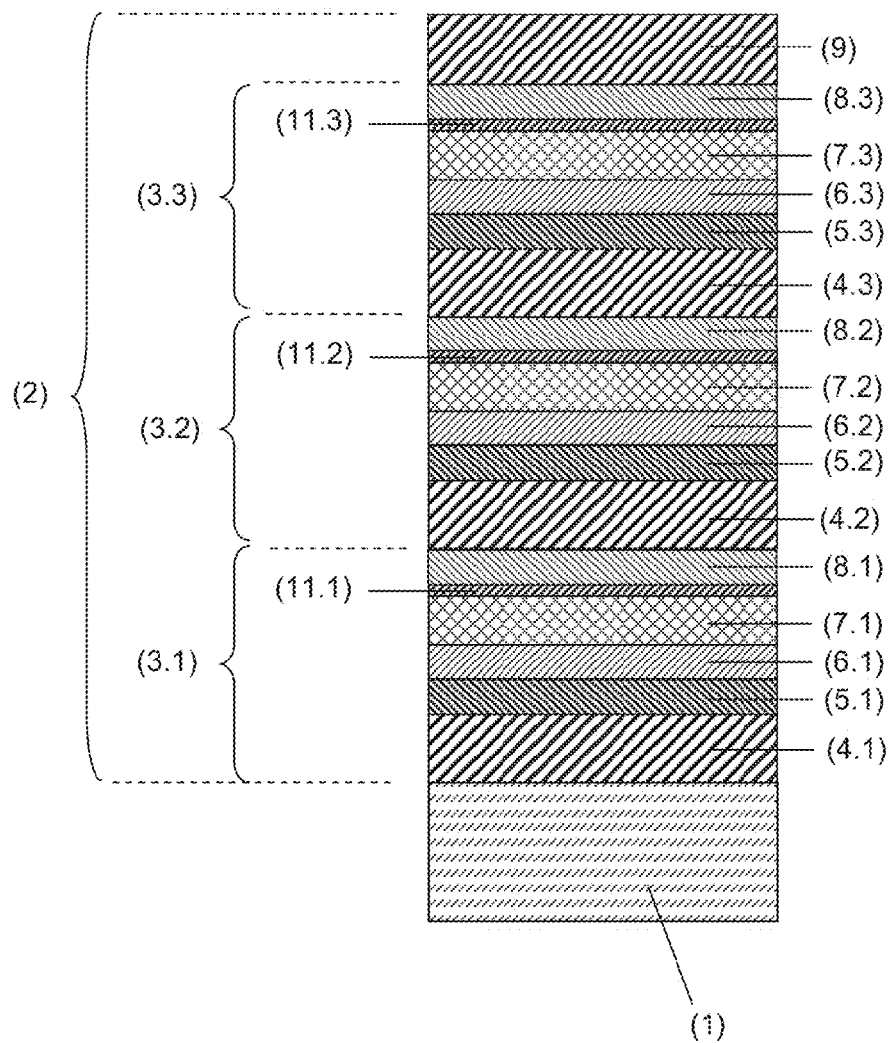

(51) Int. Cl.
| | |
|---|---|
| *H05B 3/84* | (2006.01) |
| *G02B 1/10* | (2015.01) |
| *G02B 5/20* | (2006.01) |
| *B32B 17/10* | (2006.01) |
| *C03C 17/36* | (2006.01) |

(52) U.S. Cl.
CPC ..... *B32B17/10293* (2013.01); *B32B 17/10761* (2013.01); *C03C 17/366* (2013.01); *C03C 17/3626* (2013.01); *C03C 17/3639* (2013.01); *C03C 17/3644* (2013.01); *C03C 17/3652* (2013.01); *G02B 1/10* (2013.01); *G02B 5/208* (2013.01); *H05B 3/84* (2013.01); *H05B 3/86* (2013.01); *H05B 2203/01* (2013.01); *H05B 2203/011* (2013.01); *H05B 2203/013* (2013.01); *H05B 2203/017* (2013.01); *Y10T 428/24942* (2015.01); *Y10T 428/24975* (2015.01); *Y10T 428/265* (2015.01)

(56) References Cited

U.S. PATENT DOCUMENTS

| | | | |
|---|---|---|---|
| 6,045,896 A | 4/2000 | Boire et al. | |
| 6,287,675 B1 | 9/2001 | Guiselin et al. | |
| 6,541,133 B1 | 4/2003 | Schicht et al. | |
| 6,673,427 B2 | 1/2004 | Guiselin et al. | |
| 7,314,668 B2 * | 1/2008 | Lingle | B32B 17/10009 428/428 |
| 8,022,333 B2 | 9/2011 | Maeuser | |
| 2003/0186064 A1 | 10/2003 | Murata et al. | |
| 2005/0202254 A1 | 9/2005 | Nunez-Regueiro et al. | |
| 2007/0020465 A1 | 1/2007 | Theil et al. | |
| 2007/0082219 A1 | 4/2007 | Fluery et al. | |
| 2007/0108175 A1 | 5/2007 | Andrt | |
| 2007/0188871 A1 | 8/2007 | Fleury et al. | |
| 2008/0210303 A1 | 9/2008 | Lu et al. | |
| 2008/0277320 A1 | 11/2008 | Theil | |
| 2009/0015909 A1 | 1/2009 | Fleury et al. | |
| 2009/0197077 A1 | 8/2009 | Reutler et al. | |
| 2011/0088774 A1 | 4/2011 | Gromball et al. | |
| 2011/0300319 A1 * | 12/2011 | Reymond | C03C 17/36 428/34 |
| 2012/0177900 A1 | 7/2012 | Laurent et al. | |
| 2014/0319116 A1 * | 10/2014 | Fischer | H05B 3/84 219/203 |
| 2015/0321950 A1 * | 11/2015 | Fischer | B32B 17/10036 174/258 |

FOREIGN PATENT DOCUMENTS

| | | |
|---|---|---|
| DE | 19848751 | 12/1999 |
| DE | 10333618 | 3/2005 |
| DE | 10352464 | 6/2005 |
| DE | 202004019286 | 4/2006 |
| DE | 69731268 | 9/2006 |
| EP | 0025755 | 3/1981 |
| WO | 92/04185 | 3/1992 |
| WO | 03/024155 | 3/2003 |
| WO | 2007/101964 A1 | 9/2007 |
| WO | 2009/029466 | 3/2009 |
| WO | 2011/020974 A1 | 2/2011 |

OTHER PUBLICATIONS

PCT International Search Report mailed on Nov. 23, 2014 for PCT/EP2012/069567 filed on Oct. 4, 2012 in the name of Saint-Gobain Glass France.
International Preliminary Report on Patentability issued on Jul. 15, 2014 for International Application No. PCT/EP2012/069566 filed on Oct. 4, 2012 in the name of Saint-Gobain Glass France (English Translation and German Original) 13 pages.
Written Opinion issued on Nov. 23, 2012 for International Application No. PCT/EP2012/069566 filed on Oct. 4, 2012 in the name of Saint-Gobain Glass France (English Translation and German Original) 11 pages.
International Preliminary Report on Patentability issued on Jul. 15, 2014 for International Application No. PCT/EP2012/069567 filed on Oct. 4, 2012 in the name of Saint-Gobain Glass France (English Translation and German Original) 13 pages.
Written Opinion issued on Nov. 23, 2012 for International Application No. PCT/EP2012/069567 filed on Oct. 4, 2012 in the name of Saint-Gobain Glass France (English Translation and German Original) 11 pages.
Non-Final Office Action for U.S. Appl. No. 14/358,683, filed May 15, 2014 on behalf of K. Fischer, et al. Mail Date: Jan. 29, 2015. 7 pages.
Notice of Allowance for U.S. Appl. No. 14/358,683, filed May 15, 2014 on behalf of K. Fischer, et al. Mail Date: Aug. 10, 2015. 6 pages.
Notice of Allowance for U.S. Appl. No. 14/358,683, filed May 15, 2014 on behalf of K. Fischer, et al. Mail Date: Nov. 5, 2015. 6 pages.

* cited by examiner

A - A'

TRANSPARENT PANEL WITH ELECTRICALLY CONDUCTIVE COATING

CROSS REFERENCE TO RELATED APPLICATIONS

The present application is the U.S. national stage of International Patent Application PCT/EP2012/069566 filed on Oct. 4, 2012 which, in turn, claims priority to European Patent Application EP 12150547.3 filed on Jan. 10, 2012.

The invention relates to a transparent pane with an electrically conductive coating, a method for its production, and its use.

The field of vision of a motor vehicle window, in particular a windshield, must be kept free of ice and condensation. In the case of motor vehicles with an internal combustion engine, a stream of air heated by engine heat can, for example, be directed to the windows.

Alternatively, the window can have an electrical heating function. From DE 103 52 464 A1, for example, a composite glass pane is known in which electrically heatable wires are placed between two glass panes. The specific heating output P, for example, roughly 600 W/m², can be adjusted by the ohmic resistance of the wires. Because of design and safety aspects, the number of wires as well as the diameter of the wires must be kept as small as possible. The wires must not be visible or must be hardly perceptible in daylight and at night with headlight illumination.

Also known are transparent, electrically conductive coatings, in particular based on silver. Such electrically conductive coatings can be used as coatings with reflecting properties for the infrared range or even as heatable coatings. WO 03/024155 A2 discloses, for example, an electrically conductive coating with two silver layers. Such coatings usually have sheet resistances in the range from 3 ohm/square to 5 ohm/square.

The specific heating output P of an electrically heatable coating with a sheet resistance $R_{square}$, an operating voltage U, and a distance h between two busbars can be calculated with the formula $P=U^2/(R_{square}*h^2)$. The distance h between two busbars is, in typical windshields of passenger cars, roughly 0.8 m, which corresponds approx. to the height of the pane. In order to obtain a desired specific heating output P of 600 W/m² with a sheet resistance of 4 ohm/square, an operating voltage U of roughly 40 V is necessary. Since the onboard voltage of motor vehicles is usually 14 V, a power supply or a voltage converter is necessary to generate an operating voltage of 40 V. A voltage increase from 14 V to 40 V is always associated with electrical line losses and additional costs for additional components.

US 2007/0082219 A1 and US 2007/0020465 A1 disclose transparent, electrically conductive coatings with at least three silver layers. In US 2007/0082219 A1, sheet resistances near 1 ohm/square are reported for coatings based on three silver layers. An operating voltage U=14 V, a sheet resistance $R_{square}$=1 ohm/square and a distance h=0.8 m yield a specific heating output P of roughly 300 W/m².

To provide an adequate specific heating output P, for example, roughly 500 W/m², in particular for heating relatively large panes, a further reduction of the sheet resistance of the electrically heatable coating is essential. This can be achieved with an electrically heatable coating with, typically, three silver layers by increasing the thickness of the individual silver layers. However, an excessive layer thickness of the silver layers results in inadequate optical properties of the pane, in particular with regard to transmittance and color appearance, such that legal regulations, as specified, for example, in ECE R 43 ("Uniform Provisions concerning the Approval of Safety Glazing and Composite Glass Materials"), cannot be complied with.

The adequately low sheet resistance can also be achieved through the use of four silver layers in the conductive coating, with the optical properties of the pane corresponding to the legal requirements as a result of lower layer thicknesses of the individual silver layers. However, the application of coatings with four or more layers of silver is technically complicated and costly.

The object of the present invention consists in providing a transparent pane with an improved electrically conductive coating. The electrically conductive coating should have, in particular, a lower sheet resistance $R_{square}$ compared to the prior art and, thus, have an improved specific heating output P as well as improved reflecting properties for the infrared range. The pane should have high transmittance and high color neutrality and be economically producible.

The object of the present invention is accomplished according to the invention by a transparent pane with an electrically conductive coating according to claim 1. Preferred embodiments emerge from the subclaims.

The transparent pane according to the invention comprises at least one transparent substrate and at least one electrically conductive coating on at least one surface of the transparent substrate, wherein
    the electrically conductive coating has at least two functional layers arranged one above the other and each functional layer comprises at least
        one layer of an optically highly refractive material with a refractive index greater than or equal to 2.1,
        above the layer of an optically highly refractive material, a smoothing layer, which contains at least one non-crystalline oxide,
        above the smoothing layer, a first matching layer,
        above the first matching layer, an electrically conductive layer, and
        above the electrically conductive layer, a second matching layer,
    the total layer thickness of all the electrically conductive layers is from 40 nm to 75 nm, and
    the electrically conductive coating has a sheet resistance of less than 1 ohm/square.

If a first layer is arranged above a second layer, this means, in the context of the invention, that the first layer is arranged farther from the transparent substrate than the second layer. If a first layer is arranged below a second layer, this means, in the context of the invention, that the second layer is arranged farther from the transparent substrate than the first layer. The uppermost functional layer is that functional layer that is at the greatest distance from the transparent substrate. The lowest layer is that functional layer that is at the least distance from the transparent substrate.

In the context of the invention, a layer can be made of one material. However, a layer can also comprise two or more individual layers of different materials. A functional layer according to the invention comprises, for example, at least one layer of an optically highly refractive material, a smoothing layer, a first and a second matching layer, and an electrically conductive layer.

If a first layer is arranged above or below a second layer, this does not necessarily mean, in the context of the invention, that the first and the second layer are in direct contact with each other. One or more other layers can be arranged between the first and the second layer, so long as this is not explicitly ruled out.

According to the invention, the electrically conductive coating is applied at least on one surface of the transparent substrate. However, both surfaces of the transparent substrate can also be provided with an electrically conductive coating according to the invention.

The electrically conductive coating can extend over the entire surface of the transparent substrate. However, alternatively, the electrically conductive coating can extend over only a part of the surface of the transparent substrate. The electrically conductive coating preferably extends over at least 50%, particularly preferably over at least 70%, and quite particularly preferably over at least 90% of the surface of the transparent substrate.

The electrically conductive coating can be applied directly on the surface of the transparent substrate. The electrically conductive coating can, alternatively, be applied on a carrier film that is adhesively bonded to the transparent substrate.

The particular advantage of the invention results in particular from the layers of an optically highly refractive material inside each functional layer. In the context of the invention, "optically highly refractive material" refers to a material whose refractive index is greater than or equal to 2.1. According to the prior art, layer sequences are known in which the electrically conductive layers are arranged in each case between two dielectric layers. These dielectric layers customarily include silicon nitride. It has been surprisingly demonstrated that the layers of an optically highly refractive material according to the invention result in a reduction of the sheet resistance of the electrically conductive coating with simultaneously good optical characteristics of the transparent pane, in particular higher transmittance and neutral color effect. Advantageously low values for the sheet resistance and, thus, high specific heating outputs can be achieved by means of the layers of an optically highly refractive material together with the smoothing layers according to the invention. In particular, values can be achieved for the sheet resistance for which, according to the prior art, high layer thicknesses of the electrically conductive layers were essential, which so greatly reduce the transmittance through the panes that the requirements for transmittance of a motor vehicle window pane according to ECE R 43 are not met.

The values reported for refractive indices are measured at a wavelength of 550 nm.

The transparent pane according to the invention with an electrically conductive coating preferably has a total transmittance greater than 70%. The term "total transmittance" is based on the process for testing the light permeability of motor vehicle windows specified by ECE-R 43, Annex 3, §9.1.

The electrically conductive coating has, according to the invention, a sheet resistance of less than 1 ohm/square. The sheet resistance of the electrically conductive coating is preferably from 0.4 ohm/square to 0.9 ohm/square, particularly preferably from 0.5 ohm/square to 0.8 ohm/square, for example, roughly 0.7 ohm/square. In this range for the sheet resistance, advantageously high specific heating outputs P are achieved. Moreover, the electrically conductive coating has, in this range for the sheet resistance, particularly good reflecting properties for the infrared range.

To increase the total transmittance and/or to reduce the sheet resistance, the transparent pane with an electrically conductive coating can be subjected to a temperature treatment, for example, at a temperature from 500° C. to 700° C.

It has been demonstrated that the electrically conductive coating according to the invention can be subjected to such a temperature treatment without the coating being damaged. The transparent pane according to the invention can also be convexly or concavely bent without the coating being damaged. These are major advantages of the electrically conductive coating according to the invention.

In a preferred embodiment of the invention, the electrically conductive coating has three functional layers. A technically complicated and costly production of an electrically conductive coating with four or more electrically conductive layers can thus be avoided.

The layer of an optically highly refractive material preferably has a refractive index n from 2.1 to 2.5, particularly preferably from 2.1 to 2.3.

The layer of an optically highly refractive material preferably contains at least one mixed silicon/metal nitride, particularly preferably mixed silicon/zirconium nitride. This is particularly advantageous with regard to the sheet resistance of the electrically conductive coating. The mixed silicon/zirconium nitride preferably has dopants. The layer of an optically highly refractive material can, for example, contain an aluminum-doped mixed silicon/zirconium nitride ($SiZrN_x$:Al).

The mixed silicon/zirconium nitride is preferably deposited by means of magnetic field supported cathode sputtering with a target that contains from 40 wt.-% to 70 wt.-% silicon, from 30 wt.-% to 60 wt.-% zirconium, and from 0 wt.-% to 10 wt.-% aluminum as well as production-related admixtures. The target particularly preferably contains from 45 wt.-% to 60 wt.-% silicon, from 35 wt.-% to 55 wt.-% zirconium, and from 3 wt.-% to 8 wt.-% aluminum as well as production-related admixtures. The deposition of the mixed silicon/zirconium nitride preferably takes place under addition of nitrogen as reaction gas during the cathode sputtering.

However, the layer of an optically highly refractive material can also contain, for example, at least mixed silicon/aluminum nitride, mixed silicon/hafnium nitride, or mixed silicon/titanium nitride. Alternatively, the layer of an optically highly refractive material can contain, for example, $MnO$, $WO_3$, $Nb_2O_5$, $Bi_2O_3$, $TiO_2$, $Zr_3N_4$, and/or $AlN$.

The layer thickness of each layer of an optically highly refractive material, which is arranged between two electrically conductive layers, is preferably from 35 nm to 70 nm, particularly preferably from 45 nm to 60 nm. In this range for the layer thickness, particularly advantageous sheet resistances of the electrically conductive coating and particularly good optical characteristics of the transparent pane are achieved. In the context of the invention, a layer of an optically highly refractive material is arranged between two electrically conductive layers, if at least one electrically conductive layer is arranged above the layer of an optically highly refractive material and if at least one electrically conductive layer is arranged below the layer of an optically highly refractive material. According to the invention, the layer of an optically highly refractive material is not in direct contact with the adjacent electrically conductive layers.

The layer thickness of the lowest layer of an optically highly refractive material is preferably from 20 nm to 40 nm. Particularly good results are thus obtained.

In an advantageous embodiment of the invention, a cover layer is arranged above the uppermost functional layer. The cover layer protects the layers arranged thereunder against corrosion. The cover layer is preferably dielectric. The cover layer can, for example, contain silicon nitride and/or tin oxide.

The cover layer preferably contains at least one optically highly refractive material with a refractive index greater than or equal to 2.1. The cover layer particularly preferably contains at least one mixed silicon/metal nitride, in particular mixed silicon/zirconium nitride, such as aluminum-doped mixed silicon/zirconium nitride. This is particularly advantageous with regard to the optical properties of the transparent pane according to the invention. However, the cover layer can also contain other mixed silicon/metal nitrides, for example, mixed silicon/aluminum nitride, mixed silicon/hafnium nitride, or mixed silicon/titanium nitride. Alternatively, the cover layer can also contain, for example, MnO, $WO_3$, $Nb_2O_5$, $Bi_2O_3$, $TiO_2$, $Zr_3N_4$, and/or AlN.

The layer thickness der cover layer is preferably from 20 nm to 40 nm. Particularly good results are thus obtained.

According to the invention, each functional layer of the electrically conductive coating includes at least one smoothing layer The smoothing layer is arranged below the first matching layer, preferably between the layer of an optically highly refractive material and the first matching layer. The smoothing layer is preferably in direct contact with the first matching layer. The smoothing layer effects an optimization, in particular smoothing of the surface for an electrically conductive layer subsequently applied above. An electrically conductive layer deposited on a smoother surface has a higher degree of transmittance with a simultaneously lower sheet resistance.

According to the invention, the smoothing layer contains at least one non-crystalline oxide. The oxide can be amorphous or partially amorphous (and thus partially crystalline) but is not completely crystalline. The non-crystalline smoothing layer has low roughness and thus forms an advantageously smooth surface for the layers to be applied above the smoothing layer. The non-crystalline smoothing layer further effects an improved surface structure of the layer deposited directly above the smoothing layer, which is preferably the first matching layer. The smoothing layer can, for example, contain at least one oxide of one or more of the elements tin, silicon, titanium, zirconium, hafnium, zinc, gallium, and indium.

The smoothing layer preferably contains a non-crystalline mixed oxide. The smoothing layer very particularly preferably contains a mixed tin/zinc oxide. The mixed oxide can have dopants. The smoothing layer can, for example, contain an antimony-doped mixed tin/zinc oxide ($SnZnO_x$:Sb). The mixed oxide preferably has a substoichiometric oxygen content. A method for producing mixed tin/zinc oxide layers by reactive cathode sputtering is known, for example, from DE 198 48 751 C1. The mixed tin/zinc oxide is preferably deposited with a target that contains from 25 wt.-% to 80 wt.-% zinc, from 20 wt.-% to 75 wt.-% tin, and from 0 wt.-% to 10 wt.-% antimony as well as production-related admixtures. The target particularly preferably contains from 45 wt.-% to 75 wt.-% zinc, from 25 wt.-% to 55 wt.-% tin, and from 1 wt.-% to 5 wt.-% antimony as well as production-related admixtures of other metals. The deposition of the mixed tin/zinc oxides takes place under addition of oxygen as reaction gas during the cathode sputtering.

The layer thickness of a smoothing layer is preferably from 3 nm to 20 nm, particularly preferably from 4 nm to 12 nm. The smoothing layer preferably has a refractive index of less than 2.2.

The electrically conductive layer preferably contains at least one metal, for example, gold or copper, or an alloy, particularly preferably silver or a silver-containing alloy. However, the electrically conductive layer can also contain other electrically conductive materials known to the person skilled in the art.

In an advantageous embodiment of the invention, the electrically conductive layer contains at least 90 wt.-% silver, preferably at least 99.9 wt.-% silver. The electrically conductive layer is preferably applied using conventional methods of layer deposition of metals, for example, by vacuum methods such as magnetic field supported cathode sputtering.

The electrically conductive layer preferably has a layer thickness from 8 nm to 25 nm, particularly preferably from 10 nm to 20 nm. This is particularly advantageous with regard to the transparency and the sheet resistance of the electrically conductive layer.

The total layer thickness of all the electrically conductive layers is, according to the invention, from 40 nm to 75 nm. In this range for the total thickness of all electrically conductive layers, with distances h between bus bars typical for motor vehicle windows, in particular windshields, and an operating voltage U from 12 V to 15 V, an adequately high specific heating output P and, at the same time, an adequately high transmittance are advantageously achieved. In addition, in this range for the total thickness of all the electrically conductive layers, the electrically conductive coating has particularly good reflecting properties for the infrared range. Excessively low total layer thicknesses of all the electrically conductive layers yield an excessively high sheet resistance $R_{square}$ and, thus, an excessively low specific heating output P as well as reduced reflecting properties for the infrared range. Excessively high total layer thicknesses of all the electrically conductive layers reduce the transmittance through the pane too greatly, such that the requirements for the transmittance of motor vehicle windows according to ECE R 43 are not met. It has been demonstrated that particularly good results are achieved with a total layer thickness of all the electrically conductive layers from 50 nm to 60 nm, in particular from 51 nm to 58 nm. This is particularly advantageous with regard to the sheet resistance of the electrically conductive coating and the transmittance of the transparent pane.

The first matching layer and/or the second matching layer preferably contains zinc oxide $ZnO_{1-\delta}$ with $0 \le \delta \le 0.01$, for example, aluminum-doped zinc oxide (ZnO:Al). The zinc oxide is preferably deposited substoichiometrically relative to the oxygen to prevent a reaction of excess oxygen with the silver-containing layer. The zinc oxide layer is preferably deposited by magnetic field supported cathode sputtering. The target preferably contains from 85 wt.-% to 100 wt.-% zinc oxide and from 0 wt.-% to 15 wt.-% aluminum as well as production-related admixtures. The target particularly preferably contains from 90 wt.-% to 95 wt.-% zinc oxide and from 5 wt.-% to 10 wt.-% aluminum as well as production-related admixtures. Alternatively, the target preferably contains from 95 wt.-% to 99 wt.-% zinc and from 1 wt.-% to 5 wt.-% aluminum, with the deposition of the layers taking place under addition of oxygen as reaction gas. The layer thicknesses of the first matching layer and of the second matching layer are preferably from 3 nm to 20 nm, particularly preferably from 4 nm to 12 nm.

In an advantageous embodiment of the transparent pane according to the invention, at least one functional layer includes at least one blocker layer. The blocker layer is in direct contact with the electrically conductive layer and is arranged immediately above or immediately below the electrically conductive layer. Thus, no other layer is arranged between the electrically conductive layer and the blocker layer. The functional layer can also include two blocker layers, preferably with one blocker layer arranged immediately above and one blocker layer arranged immediately below the electrically conductive layer. Particularly preferably, each functional layer includes at least one such blocker layer. The blocker layer preferably contains niobium, titanium, nickel, chromium, and/or alloys thereof, particularly preferably nickel-chromium alloys. The layer thickness of the blocker layer is preferably from 0.1 nm to 2 nm. Thus, good results are obtained. A blocker layer immediately below the electrically conductive layer serves, in particular, to stabilize the electrically conductive layer during a temperature treatment and improves the optical quality of the electrically conductive coating. A blocker layer immediately above the electrically conductive layer prevents the contact of the sensitive electrically conductive layer with the oxidizing reactive atmosphere during the deposition of the next layer by reactive cathode sputtering, for example, the second matching layer, which preferably contains zinc oxide.

Blocker layers, for example, based on titanium or nickel-chromium alloys, are known per se according to the prior art. Typically, blocker layers with a thickness of roughly 0.5 nm or even a few nanometers are used. It has been surprisingly demonstrated that the configuration according to the invention of the electrically conductive coating results in a reduced susceptibility of the coating to defects, which are, for example, caused by corrosion or surface defects of the transparent substrate. Consequently, blocker layers with a significantly reduced layer thickness can be used in the electrically conductive coating according to the invention. The particular advantage of particularly thin blocker layers resides in increased transmittance and color neutrality of the transparent pane according to the invention with an electrically conductive coating as well as in lower production costs. Particularly good results are obtained with a layer thickness of the blocker layers from 0.1 nm to 0.5 nm, preferably from 0.1 nm to 0.3 nm, in particular from 0.2 nm to 0.3 nm.

The transparent substrate preferably contains glass, particularly preferably flat glass, float glass, quartz glass, borosilicate glass, soda lime glass, or clear plastics, preferably rigid clear plastics, in particular polyethylene, polypropylene, polycarbonate, polymethyl methacrylate, polystyrene, polyamide, polyester, polyvinyl chloride, and/or mixtures thereof. Examples of appropriate types of glass are known from DE 697 31 268 T2, page 8, paragraph [0053].

The thickness of the transparent substrate can vary widely and thus be ideally adapted to the requirements of the individual case. Preferably, panes with the standard thicknesses from 1.0 mm to 25 mm and preferably from 1.4 mm to 2.6 mm are used. The size of the transparent substrate can vary widely and is determined by the use according to the invention. The transparent substrate has, for example, in the automotive sector and in the architectural sector, customary areas from 200 cm$^2$ all the way to 4 m$^2$.

The transparent substrate can have any three-dimensional shape. Preferably, the three-dimensional shape has no shadow zones such that it can, for example, be coated by cathode sputtering. The transparent substrate is preferably planar or slightly or greatly curved in one or a plurality of spatial directions. The transparent substrate can be colorless or tinted.

In an advantageous embodiment of the invention, the transparent substrate is bonded via at least one thermoplastic intermediate layer to a second pane to form a composite pane. The electrically conductive coating according to the invention is preferably applied on the surface of the transparent substrate facing the thermoplastic intermediate layer. Thus, the electrically conductive coating is advantageously protected against damage and corrosion.

The composite pane preferably has a total transmittance greater than 70%.

The thermoplastic intermediate layer preferably contains thermoplastic plastics, for example, polyvinyl butyral (PVB), ethylene vinyl acetate (EVA), polyurethane (PU), polyethylene terephthalate (PET), or multiple layers thereof, preferably with thicknesses from 0.3 mm to 0.9 mm.

The second pane preferably contains glass, particularly preferably flat glass, float glass, quartz glass, borosilicate glass, soda lime glass, or clear plastics, preferably rigid clear plastics, in particular polyethylene, polypropylene, polycarbonate, polymethyl methacrylate, polystyrene, polyamide, polyester, polyvinyl chloride, and/or mixtures thereof. The second pane preferably has a thickness from 1.0 mm to 25 mm and particularly preferably from 1.4 mm to 2.6 mm.

The electrically conductive coating preferably extends over the entire surface of the transparent substrate, minus a circumferential frame-like coating-free region with a width from 2 mm to 20 mm, preferably from 5 mm to 10 mm. The coating-free region is preferably hermetically sealed by the thermoplastic intermediate layer or an acrylate adhesive as a vapor diffusion barrier. The corrosion-sensitive electrically conductive coating is protected against moisture and atmospheric oxygen by the vapor diffusion barrier. If the composite pane is provided as a motor vehicle window, for example, as a windshield, and if the electrically conductive coating is used as an electrically heatable coating, the circumferential coating-free region also effects electrical insulation between the voltage-carrying coating and the motor vehicle body.

The transparent substrate can be coating-free in at least one other region, which serves, for example, as a data transmission window or a communication window. In the other coating-free region, the transparent pane is permeable to electromagnetic radiation and, in particular, to infrared radiation.

The electrically conductive coating can be applied directly on the surface of the transparent substrate. Alternatively, the electrically conductive coating can be applied on a carrier film that is embedded between two intermediate layers. The carrier film preferably contains a thermoplastic polymer, in particular polyvinyl butyral (PVB), ethylene vinyl acetate (EVA), polyurethane (PU), polyethylene terephthalate (PET), or combinations thereof.

The transparent substrate can, for example, also be connected to a second pane via spacers to form an insulating glazing unit. The transparent substrate can also be connected to more than one other pane via thermoplastic intermediate layers and/or spacers. If the transparent substrate is connected to one or a plurality of other panes, one or a plurality of these other panes can also have an electrically conductive coating.

In a preferred embodiment, the electrically conductive coating according to the invention is an electrically heatable coating. In that case, the electrically conductive coating is suitably contacted electrically.

In another preferred embodiment, the electrically conductive coating according to the invention is a coating with reflecting properties for the infrared range. For this, the electrically conductive coating need not be electrically contacted. In the context of the invention, "coating with reflecting properties for the infrared range" is understood to mean, in particular, a coating that has a reflectance of at least 20% in the wavelength range from 1000 nm to 1600 nm. Preferably, the electrically conductive coating according to the invention has a reflectance greater than or equal to 50% in the wavelength range from 1000 nm to 1600 nm.

In an advantageous embodiment of the invention, the electrically conductive coating is connected via collecting conductors to a voltage source and a voltage applied on the electrically conductive coating preferably has a value from 12 V to 15 V. The collecting conductors, so-called busbars, serve to transfer electrical power. Examples of suitable busbars are known from DE 103 33 618 B3 and EP 0 025 755 B1.

The busbars are advantageously produced by printing a conductive paste. If the transparent substrate is bent after application of the electrically conductive coating, the conductive paste is preferably baked in before the bending and/or at the time of the bending of the transparent substrate. The conductive paste preferably contains silver particles and glass frits. The layer thickness of the baked-in conductive paste is preferably from 5 μm to 20 μm.

In an alternative embodiment, thin and narrow metal foil strips or metal wires are used as busbars, which preferably contain copper and/or aluminum; in particular, copper foil strips with a thickness of preferably 10 μm to 200 μm, for example, roughly 50 μm, are used. The width of the copper foil strips is preferably 1 mm to 10 mm. The electrical contact between the electrically conductive coating and the busbar can, for example, be produced by soldering or gluing with an electrically conductive adhesive. If the transparent substrate is part of a composite glass, the metal foil strips or metal wires can be placed on the electrically conductive coating during the assembly of the composite layers. In the subsequent autoclave process, a secure electrical contact between the busbars and the coating is achieved through the action of heat and pressure.

In the automotive sector, foil conductors are customarily used as feed lines for contacting busbars in the interior of composite panes. Examples of foil conductors are described in DE 42 35 063 A1, DE 20 2004 019 286 U1, and DE 93 13 394 U1.

Flexible foil conductors, sometimes also called "flat conductors" or "flat-band conductors", are preferably made of a tinned copper strip with a thickness from 0.03 mm to 0.1 mm and a width from 2 mm to 16 mm. Copper has proved successful for such conductor tracks, since it has good electrical conductivity as well as good processability into foils. At the same time, material costs are low. Other electrically conductive materials that can be processed into foils can also be used. Examples for this are aluminum, gold, silver, or tin and alloys thereof.

For electrical insulation and for stabilization, the tinned copper strip is applied on a carrier material made of plastic or laminated therewith on both sides. The insulation material contains, as a rule, a 0.025-mm- to 0.05-mm-thick polyimide-based film. Other plastics or materials with the required insulating properties can also be used. A plurality of conductive layers electrically isolated from each other can be situated in one foil conductor strip.

Foil conductors that are suitable for contacting electrically conductive layers in composite panes have a total thickness of only 0.3 mm. Such thin foil conductors can be embedded without difficulty in the thermoplastic intermediate layer between the individual panes.

Alternatively, thin metal wires can also be used as feed lines. The metal wires contain, in particular, copper, tungsten, gold, silver, or aluminum or alloys of at least two of these metals. The alloys can also contain molybdenum, rhenium, osmium, iridium, palladium, or platinum.

The invention further includes a method for producing a transparent pane according to the invention with an electrically conductive coating, wherein at least two functional layers are applied one after another on a transparent substrate and for applying each functional layer one after another at least (a) one layer of an optically highly refractive material with a refractive index greater than or equal to 2.1,
(b) a smoothing layer, which contains at least one non-crystalline oxide,
(c) a first matching layer,
(d) an electrically conductive layer, and
(e) a second matching layer are applied.

In an advantageous embodiment of the invention, a blocker layer is applied before or after the application of at least one electrically conductive layer.

In an advantageous embodiment of the invention, a cover layer is applied after the application of the uppermost functional layer.

The individual layers are deposited by methods known per se, for example, by magnetic field supported cathode sputtering. The cathode sputtering takes place in a protective gas atmosphere, for example, of argon, or in a reactive gas atmosphere, for example, through addition of oxygen or nitrogen.

The layer thicknesses of the individual layers with the desired properties with regard to transmittance, sheet resistance, and color values emerge for the person skilled in the art in a simple manner through simulations in the range of the above indicated layer thicknesses.

In an advantageous embodiment of the invention, the transparent substrate and a second pane are heated to a temperature from 500° C. to 700° C. and the transparent substrate and the second pane are bonded congruently to a thermoplastic intermediate layer. The heating of the pane can take place within a bending process. The electrically conductive coating must, in particular, be suited to withstand the bending process and/or the laminating process without damage. The properties, in particular, the sheet resistance of the above described electrically conductive coating are regularly improved by heating.

The electrically conductive coating can be connected to at least two busbars before the heating of the substrate.

The invention further includes the use of the transparent pane according to the invention as a pane or as a component of a pane, in particular as a component of an insulating glazing unit or a composite pane, in buildings or in means of transportation for travel on land, in the air, or on water, in particular motor vehicles, for example, as a windshield, rear window, side window, and/or roof pane or as a component of a windshield, rear window, side window, and/or roof pane, in particular for heating a window and/or for reducing the heating of an interior space. The pane according to the invention is used, in particular, as a pane with reflecting properties for the infrared range and/or as an electrically heatable pane.

In the following, the invention is explained in detail with reference to drawings and exemplary embodiments. The drawings are a schematic representation and are not true to scale. The drawings in no way restrict the invention.

Figure 2:
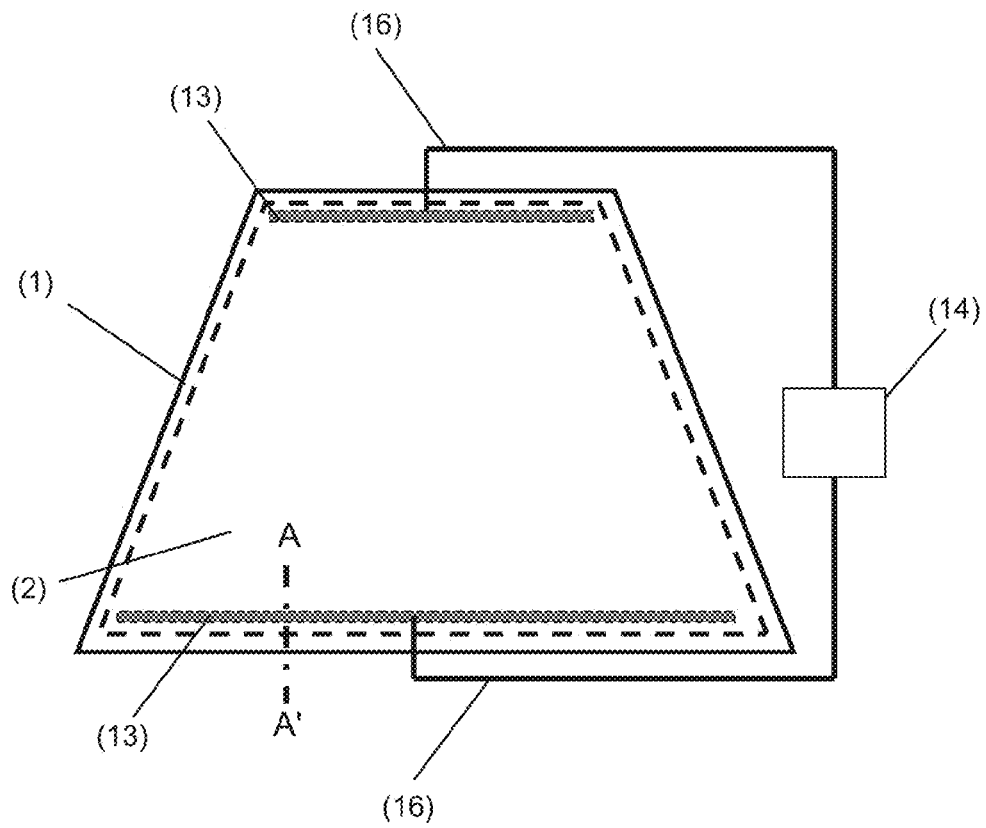
Figure 3:
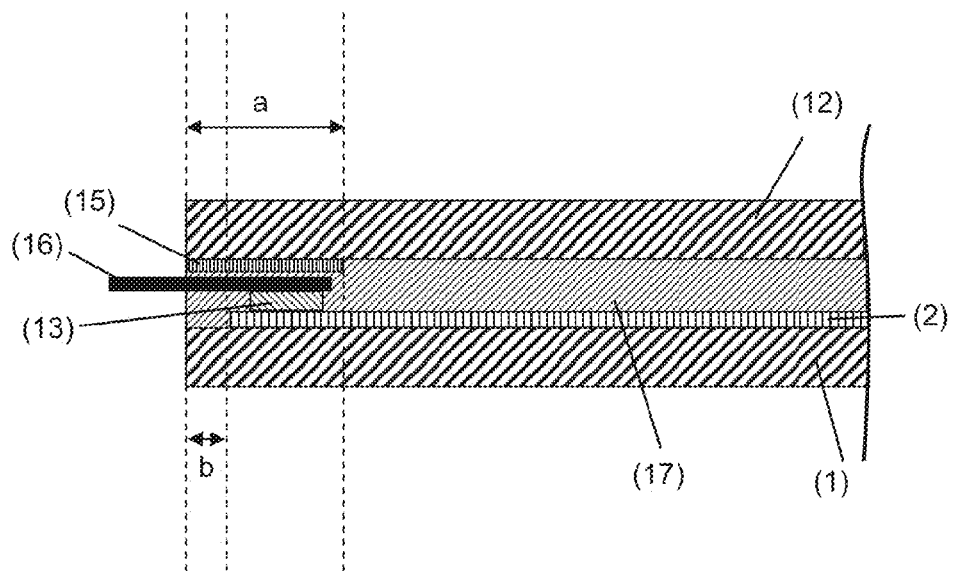
Figure 4:
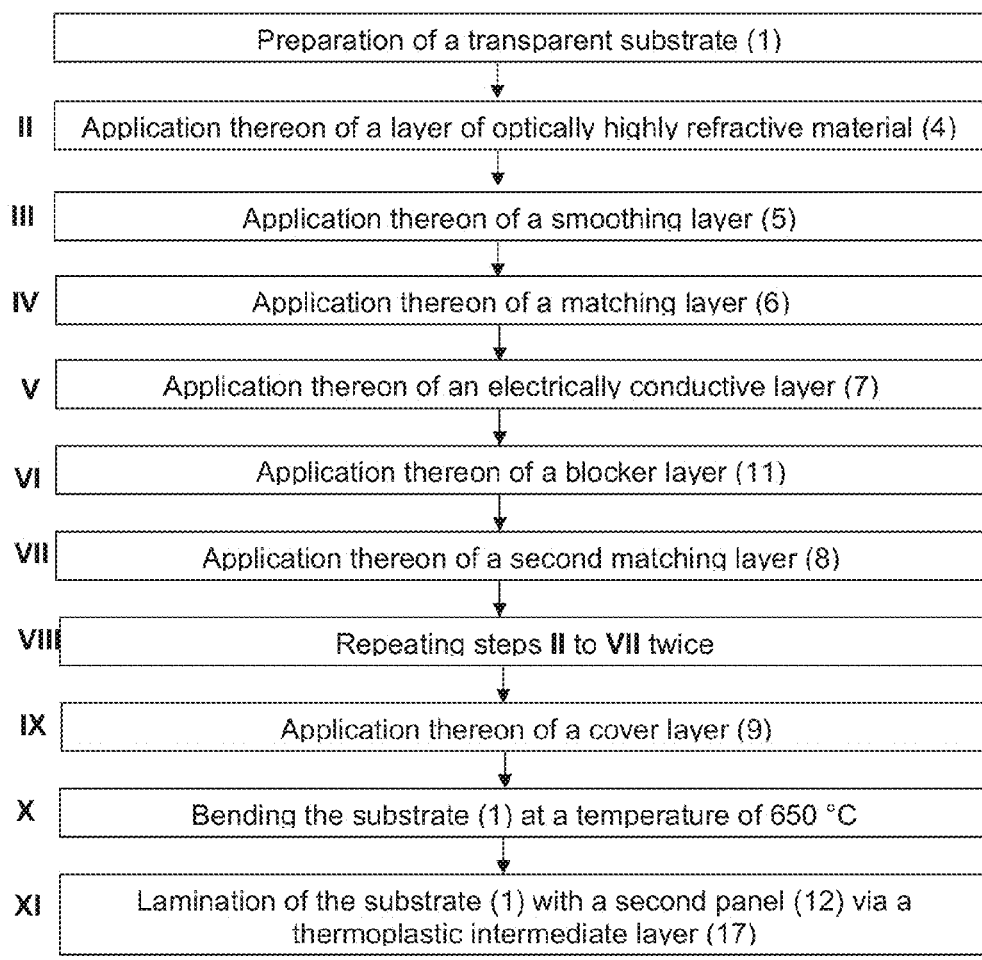

They depict:

FIG. 1 a cross-section through an embodiment of the transparent pane according to the invention with an electrically conductive coating, FIG. 2 a plan view of a transparent pane according to the invention as part of a composite pane, FIG. 3 a cross-section A-A' through the composite pane of FIG. 2, and FIG. 4 a detailed flow chart of an embodiment of the method according to the invention.

FIG. 1 depicts a cross-section through an embodiment of the transparent pane according to the invention with an electrically conductive coating with the transparent substrate 1 and the electrically conductive coating 2. The substrate 1 contains float glass and has a thickness of 2.1 mm. The electrically conductive coating 2 comprises three functional layers 3 (3.1, 3.2, and 3.3), which are arranged congruently one over another. Each functional layer 3 comprises a layer of optically highly refractive material 4 (4.1, 4.2 and 4.3),
a smoothing layer 5 (5.1, 5.2, and 5.3),
a first matching layer 6 (6.1, 6.2, and 6.3)
an electrically conductive layer 7 (7.1, 7.2, and 7.3),
a blocker layer 11 (11.1, 11.2, and 11.3), and
a second matching layer 8 (8.1, 8.2, and 8.3).

The layers are arranged in the order indicated with increasing distance from the transparent substrate 1. A cover layer 9 is arranged above the uppermost functional layer 3.3. The exact layer sequence with suitable materials and exemplary layer thicknesses is presented in Table 1.

The individual layers of the electrically conductive coating 2 were deposited by cathode ray sputtering. The target for the deposition of the matching layers 6, 8 contained 92 wt.-% zinc oxide (ZnO) and 8 wt.-% aluminum. The target for the deposition of the smoothing layers 5 contained 68 wt.-% tin, 30 wt.-% zinc, and 2 wt.-% antimony. The deposition took place under the addition of oxygen as reaction gas during the cathode sputtering. The target for the deposition of the layers of an optically highly refractive material 4 as well as the cover layer 9 contained 52.9 wt.-% silicon, 43.8 wt.-% zirconium, and 3.3 wt.-% aluminum. The deposition took place under the addition of nitrogen as reaction gas during the cathode sputtering.

Advantageously, by means of the embodiment according to the invention of the electrically conductive coating 2 with the layers of an optically highly refractive material 4 and the smoothing layers 5, a reduced sheet resistance compared to the prior art and, thus, improved reflection properties for the infrared range and an improved specific heating output were achieved. The optical properties of the transparent pane according to the invention with an electrically conductive coating satisfy the legal requirements for glazings in the automotive industry.

FIG. 2 and FIG. 3 each depict a detail of a transparent pane according to the invention with an electrically conductive coating as part of a composite pane. The composite pane is provided as a windshield of a passenger car. The transparent substrate 1 is bonded via a thermoplastic intermediate layer 17 to a second pane 12. FIG. 2 depicts a plan view of the surface of the transparent substrate 1 facing away from the thermoplastic intermediate layer. The transparent substrate 1 is the pane facing the interior of the passenger car. The transparent substrate 1 and the second pane 12 contain float glass and have a thickness of 2.1 mm each. The thermoplastic intermediate layer 17 contains polyvinyl butyral (PVB) and has a thickness of 0.76 mm.

An electrically conductive coating 2 is applied on the surface of the transparent substrate 1 facing the thermoplastic intermediate layer 17. The electrically conductive coating 2 is an electrically heatable coating and, for this, is electrically contacted. The electrically conductive coating 2 extends over the entire surface of the transparent substrate 1 minus a circumferential frame-like coating-free region with a width b of 8 mm. The coating-free region serves for electrical insulation between the voltage-carrying electrically conductive coating 2 and the vehicle body. The coating-free region is hermetically sealed by gluing to the intermediate layer 17 in order to protect the electrically conductive coating 2 against damage and corrosion.

A busbar 13 is arranged for the electrical contacting of the electrically conductive coating 2 in each case on the outer upper and lower edge of the transparent substrate 1. The busbars 13 were printed onto the electrically conductive coating 2 using a conductive silver paste and baked in. The layer thickness of the baked-in silver paste is 15 µm. The busbars 13 are connected electrically conductively to the regions of the electrically conductive coating 2 lying thereunder.

The feed lines 16 are made of tinned copper foils with a width of 10 mm and a thickness of 0.3 mm. Each feed line 16 is, in each case, soldered to one of the busbars 13. The electrically conductive coating 2 is connected via the busbars 13 and the feed lines 16 to a voltage source 14. The voltage source 14 is the onboard voltage of 14 V of a motor vehicle.

An opaque color layer with a width a of 20 mm is applied frame-like as a masking print 15 on the second pane 12, on the edge of the surface facing the thermoplastic intermediate layer 17. The masking print 15 conceals from view the strand of adhesive with which the composite pane is bonded into the vehicle body. The masking print 15 serves, at the same time, as protection of the adhesive again UV radiation and thus as protection against premature aging of the adhesive. Moreover, the busbars 13 and the feed lines 16 are concealed by the masking print 15.

FIG. 3 depicts a section along A-A' through the composite pane of FIG. 2 in the region of the lower edge. The transparent substrate 1 with the electrically conductive coating 2, the second pane 12, the thermoplastic intermediate layer 17, a busbar 13, and a feed line 16 as well as the masking print 15 are seen.

FIG. 4 depicts a flowchart of an exemplary embodiment of the method according to the invention for producing a transparent pane with an electrically conductive coating 2.

EXAMPLES

A transparent pane according to the invention with an electrically conductive coating was produced. The layer sequence and the layer thicknesses for Examples 1 and 2 according to the invention are presented in Table 1. After the coating of the transparent substrate 1, the sheet resistance of the electrically conductive coating 2 was determined. The transparent substrate 1 provided with the electrically conductive coating 2 was then bent at a temperature of roughly 650° C. The bending process lasted roughly 10 min. Then, the transparent substrate 1 was laminated with a likewise bent second pane 12 with a thickness of 2.1 mm via a thermoplastic intermediate layer 17 at a temperature of roughly 140° C. and a pressure of roughly 12 bar. The thermoplastic intermediate layer contained polyvinyl butyral (PVB) and had a thickness of 0.76 mm. The electrically conductive coating 2 was arranged facing the thermoplastic intermediate layer 17.

The values measured for the sheet resistance $R_{square}$ before and after the temperature treatment are summarized in Table 3.

TABLE 1

| Material | Reference Character | | Layer thickness | |
|---|---|---|---|---|
| | | | Example 1 | Example 2 |
| SiZrN$_x$:Al | 9 | | 40 nm | 40 nm |
| ZnO:Al | 8.3 | 3.3 | 10 nm | 10 nm |
| NiCr | 11.3 | | 0.1 nm | 0.1 nm |
| Ag | 7.3 | | 16 nm | 18 nm |
| ZnO:Al | 6.3 | | 10 nm | 10 nm |
| SnZnO$_x$:Sb | 5.3 | | 6 nm | 6 nm |
| SiZrN$_x$:Al | 4.3 | | 59 nm | 60 nm |
| ZnO:Al | 8.2 | 3.2 | 10 nm | 10 nm |
| NiCr | 11.2 | | 0.1 nm | 0.1 nm |
| Ag | 7.2 | | 16 nm | 18 nm |
| ZnO:Al | 6.2 | | 10 nm | 10 nm |
| SnZnO$_x$:Sb | 5.2 | | 6 nm | 6 nm |
| SiZrN$_x$:Al | 4.2 | | 63 nm | 59 nm |
| ZnO:Al | 8.1 | 3.1 | 5 nm | 5 nm |
| NiCr | 11.1 | | 0.1 nm | 0.1 nm |
| Ag | 7.1 | | 15 nm | 18 nm |
| ZnO:Al | 6.1 | | 10 nm | 10 nm |
| SnZnO$_x$:Sb | 5.1 | | 6 nm | 6 nm |
| SiZrN$_x$:Al | 4.1 | | 28 nm | 28 nm |
| Glass | 1 | | 2.1 mm | 2.1 mm |

COMPARATIVE EXAMPLES

The comparative examples were carried out exactly the same as the Examples. The difference resided in the electrically conductive coating 2. In contrast to the Examples, no layers of an optically highly refractive material pursuant to the invention were arranged between each two electrically conductive silver layers but, instead, dielectric layers containing silicon nitride were. Such layers containing silicon nitride are known according to the prior art for the separation of electrically conductive layers. In Comparative Example 1, the electrically conductive coating further included, in contrast to the Example according to the invention, only one smoothing layer containing antimony-doped tin-zinc-oxide, which was arranged under the lowest silver layer. In Comparative Example 2, the electrically conductive coating included, as in the Example according to the invention, a total of three smoothing layers containing antimony-doped tin-zinc-oxide, with each smoothing layer arranged in each case below an electrically conductive silver layer. The layer thicknesses of the electrically conductive layers, which contained silver, were selected in the Comparative Examples exactly as in Example 1 according to the invention. The exact layer sequence with layer thicknesses and materials of the Comparative Examples is presented in Table 2.

The values measured for the sheet resistance $R_{square}$ before and after the temperature treatment are summarized in Table 3.

TABLE 2

| | Layer Thickness | |
|---|---|---|
| Material | Comparative Example 1 | Comparative Example 2 |
| SiZrN$_x$:Al | 40 nm | 40 nm |
| ZnO:Al | 10 nm | 10 nm |
| NiCr | 0.1 nm | 0.1 nm |
| Ag | 16 nm | 16 nm |
| ZnO:Al | 10 nm | 10 nm |
| SnZnO$_x$:Sb | (none) | 6 nm |
| Si$_3$N$_4$ | 65 nm | 65 nm |
| ZnO:Al | 10 nm | 10 nm |
| NiCr | 0.1 nm | 0.1 nm |
| Ag | 16 nm | 16 nm |
| ZnO:Al | 10 nm | 10 nm |
| SnZnO$_x$:Sb | (none) | 6 nm |
| Si$_3$N$_4$ | 69 nm | 69 nm |
| ZnO:Al | 5 nm | 5 nm |
| NiCr | 0.1 nm | 0.1 nm |
| Ag | 15 nm | 15 nm |
| ZnO:Al | 10 nm | 10 nm |
| SnZnO$_x$:Sb | 6 nm | 6 nm |
| SiZrN$_x$:Al | 28 nm | 28 nm |
| Glass | 2.1 mm | 2.1 mm |

TABLE 3

| | $R_{square}$ [ohm/square] Before Temperature Treatment | $R_{square}$ [ohm/square] After Temperature Treatment and Lamination |
|---|---|---|
| Example 1 | 1.06 | 0.83 |
| Example 2 | 0.84 | 0.66 |
| Comparative example 1 | 1.26 | 1.03 |
| Comparative example 2 | 1.12 | 0.88 |

Due to the same thicknesses of the electrically conductive layers, the comparison between Example 1 according to the invention and the Comparative Examples illustrates the effect of the configuration according to the invention of the electrically conductive coating 2 with the layers of an optically highly refractive material 4 on the sheet resistance. The electrically conductive coating 2 in Example 1 according to the invention surprisingly had, already before the temperature treatment, a sheet resistance $R_{square}$ reduced by 16% compared to Comparative Example 1. The temperature treatment resulted in a further reduction of the sheet resistance $R_{square}$. After temperature treatment and lamination, the sheet resistance $R_{square}$ of the electrically conductive coating 2 in the Example according to the invention was lowered by 19% compared to Comparative Example 1.

The lowering of the sheet resistance $R_{square}$ of the electrically conductive coating 2 in Example 1 according to the invention compared to Comparative Example 1 cannot be attributed exclusively to the presence of the additional smoothing layers 5.2 and 5.3, as is clear from Comparative Example 2. The additional smoothing layers in Comparative Example 2 do, in fact, result in a reduction of the sheet resistance $R_{square}$ compared to Comparative Example 1 by 13% before the temperature treatment and by 15% after the temperature treatment. The especially low sheet resistance of Example 1 with the layers according to the invention of an optically highly refractive material 4.2 and 4.3 is, however, not achieved in Comparative Example 2. In Example 1 according to the invention, the sheet resistance $R_{square}$ is reduced compared to Comparative Example 2 by 5% before the temperature treatment and by 6% after the temperature treatment.

Example 2 according to the invention had the same layer sequence as Example 1. However, the layer thicknesses were selected differently than in Example 1. In particular, the electrically conductive coating 2 in Example 2 had thicker electrically conductive layers 7. By this means, it was possible to further reduce the sheet resistance of the electrically conductive coating 2.

Table 4 summarizes the optical properties of the composite glazing made of the transparent pane according to the invention with an electrically conductive coating of Example 2, of the second pane 12, and of the thermoplastic intermediate layer 17. $T_L(A)$ refers to the total transmittance of light type A, Ra* (D65/8°), and Rb* (D65/8°) the chromaticity coordinates in the L*a*b*-color space with reflection of light type D65 and an angle of incidence of 8°, Ta* (D65/8°) and Tb* (D65/8°) the chromaticity coordinates in the L*a*b*-color space with transmittance of light type D65 and an angle of incidence of 8°. The total transmittance through the transparent pane according to the invention was greater than 70% after the temperature treatment. The color values in the L*a*b*-color space were at favorable values. The transparent pane according to the invention meets the legal requirements relative to transmittance and neutral coloration and can be used as motor vehicle glazing.

TABLE 4

| $R_{square}$ [ohm/square] | 0.66 |
|---|---|
| $T_L$ (A) [%] | 70.2 |
| Ra* (D65/8°) | 1.9 |
| Rb* (D65/8°) | −12.3 |
| Ta* (D65/8°) | −6.7 |
| Tb* (D65/8°) | 5.6 |

In further experiments, it was demonstrated that for the electrically conductive coating 2 according to the invention, sheet resistances to a minimum of roughly 0.4 ohm/square can be achieved with a transmittance through the transparent pane greater than 70%.

The sheet resistance $R_{square}$ of the electrically conductive coating 2 is significantly reduced by means of the layers according to the invention of an optically highly refractive material 4 and the smoothing layers 5 according to the invention. The transparent pane according to the invention has high transmittance and high color neutrality. The lower sheet resistance $R_{square}$ results in an improvement of the specific heating output P when the electrically conductive coating 2 is used as an electrically heatable coating with, at the same time, good optical properties of the transparent pane. This result was unexpected and surprising for the person skilled in the art.

LIST OF REFERENCE CHARACTERS (1) transparent substrate
(2) electrically conductive coating
(3) functional layer
(3.1), (3.2), (3.3) first, second, third functional layer
(4) layer of an optically highly refractive material
(4.1), (4.2), (4.3) first, second, third layer of an optically highly refractive material
(5) smoothing layer
(5.1), (5.2), (5.3) first, second, third smoothing layer
(6) first matching layer
(6.1), (6.2), (6.3) first, second, third first matching layer
(7) electrically conductive layer
(7.1), (7.2), (7.3) first, second, third electrically conductive layer
(8) second matching layer
(8.1), (8.2), (8.3) first, second, third second matching layer
(9) cover layer
(11) blocker layer
(11.1), (11.2), (11.3) first, second, third blocker layer
(12) second pane
(13) busbar
(14) voltage source
(15) masking print
(16) feed line
(17) thermoplastic intermediate layer
a width of the region masked by (15)
b width of the coating-free region
A-A' section line

The invention claimed is:
1. A transparent pane, comprising:
at least one transparent substrate, and
at least one electrically conductive coating on at least one surface of the transparent substrate,
wherein:
the electrically conductive coating has at least two functional layers arranged one above the other and each functional layer comprises at least:
one layer of an optically highly refractive material with a refractive index greater than or equal to 2.1,
above the layer of the optically highly refractive material, a smoothing layer, which contains at least one non-crystalline oxide,
above the smoothing layer, a first matching layer,
above the first matching layer, an electrically conductive layer, and
above the electrically conductive layer, a second matching layer,
a total layer thickness of all the electrically conductive layers is from 40 nm to 75 nm, and the electrically conductive coating has a sheet resistance less than 1 ohm/square, and
wherein the layer of the optically highly refractive material contains at least one mixed silicon/metal nitride.

2. The transparent pane according to claim 1, wherein the electrically conductive coating is an electrically heatable coating.

3. The transparent pane according to claim 1, wherein the electrically conductive coating is a coating with reflecting properties for the infrared range.

4. The transparent pane according to claim 1, wherein the electrically conductive coating has three functional layers arranged one above the other.

5. The transparent pane according to claim 1, wherein the electrically conductive coating has a sheet resistance from 0.4 ohm/square to 0.9 ohm/square.

6. The transparent pane according to claim 1, wherein the total layer thickness of all the electrically conductive layers is from 50 nm to 60 nm.

7. The transparent pane according to claim 1, wherein the layer of an optically highly refractive material contains at least one mixed silicon/zirconium nitride.

8. The transparent pane according to claim 1, wherein each layer of an optically highly refractive material arranged between two electrically conductive layers has a thickness from 35 nm to 70 nm.

9. The transparent pane according to claim 1, wherein the smoothing layer contains at least one non-crystalline mixed oxide and has a thickness from 3 nm to 20 nm.

10. The transparent pane according to claim 9, wherein the mixed tin/zinc oxide is antimony-doped mixed tin/zinc oxide.

11. The transparent pane according to claim 1, wherein the electrically conductive layer contains at least silver or a silver-containing alloy and has a layer thickness from 8 nm to 25 nm.

12. The transparent pane according to claim 1, wherein the first matching layer or the second matching layer contains zinc oxide $ZnO_{1-\delta}$ with $0<\delta<0.01$ and has a thickness from 3 nm to 20 nm.

13. The transparent pane according to claim 1, wherein at least one functional layer includes at least one blocker layer, which is arranged immediately above or immediately below the electrically conductive layer and which contains at least niobium, titanium, nickel, chromium, or alloys thereof, and wherein the blocker layer has a thickness from 0.1 nm to 2 nm.

14. The transparent pane according to claim 1, wherein a cover layer is arranged above the uppermost functional layer and wherein the cover layer preferably contains at least one optically highly refractive material with a refractive index greater than or equal to 2.1.

15. The transparent pane according to claim 14, wherein the at least one optically highly refractive material contained in the cover layer is a mixed silicon/metal nitride.

16. The transparent pane according to claim 14, wherein the at least one optically highly refractive material contained in the cover layer is a mixed silicon/zirconium nitride.

17. The transparent pane according to claim 14, wherein the at least one optically highly refractive material contained in the cover layer is aluminum-doped mixed silicon/zirconium nitride.

18. The transparent pane according to claim 1, wherein the transparent substrate is bonded to a second pane via at least one thermoplastic intermediate layer to form a composite pane and wherein a total transmittance of the composite pane is greater than 70%.

19. A method for producing the transparent pane with the electrically conductive coating according to claim 1, comprising:
- applying at least two functional layers one after another on a transparent substrate, and
- applying, for each functional layer one after another at least:
  - one layer of an optically highly refractive material with a refractive index greater than or equal to 2.1,
  - a smoothing layer, which contains at least one non-crystalline oxide,
  - a first matching layer,
  - an electrically conductive layer, and
  - a second matching layer.

20. A method comprising:
using the transparent pane according to claim 1 as a pane or as a component of a pane in buildings or in means of transportation for travel.

21. The transparent pane according to claim 1, wherein the at least one mixed silicon/zirconium nitride is an aluminum-doped mixed silicon/zirconium nitride.

22. The transparent pane according to claim 1, wherein each layer of an optically highly refractive material arranged between two electrically conductive layers has a thickness from 45 nm to 60 nm.

23. The transparent pane according to claim 1, wherein the smoothing layer contains a mixed tin/zinc oxide and has a thickness from 3 nm to 20 nm.

24. The transparent pane according to claim 1, wherein the smoothing layer contains at least one non-crystalline mixed oxide and has a thickness from 4 nm to 12 nm.

25. The transparent pane according to claim 1, wherein the electrically conductive layer contains at least silver or a silver-containing alloy and has a layer thickness from 10 nm to 20 nm.

26. The transparent pane according to claim 1, wherein the first matching layer or the second matching layer contains aluminum-doped zinc oxide.

27. The transparent pane according to claim 1, wherein the first matching layer or the second matching layer contains zinc oxide $ZnO_{1-\delta}$ with $0<\delta<0.01$ and has a thickness from 4 nm to 12 nm.

28. The transparent pane according to claim 1, wherein each functional layer includes at least one blocker layer, which is arranged immediately above or immediately below the electrically conductive layer and which contains at least niobium, titanium, nickel, chromium, or alloys thereof, and wherein the blocker layer has a thickness from 0.1 nm to 2 nm.

29. The transparent pane according to claim 1, wherein at least one functional layer includes at least one blocker layer, which is arranged immediately above or immediately below the electrically conductive layer and which contains nickel-chromium alloys, and wherein the blocker layer has a thickness from 0.1 nm to 2 nm.

30. The transparent pane according to claim 1, wherein at least one functional layer includes at least one blocker layer, which is arranged immediately above or immediately below the electrically conductive layer and which preferably contains at least niobium, titanium, nickel, chromium, or alloys thereof, and wherein the blocker layer has a thickness from 0.1 nm to 0.3 nm.

31. A method comprising:
using the transparent pane according to claim 1 as an insulating glazing unit or a composite pane in buildings.

32. A method comprising:
using the transparent pane according to claim 1 as a pane or a component of a pane in a windshield, rear window, side window, or roof pane in motor vehicles.

33. A method comprising:
using the transparent pane according to claim 1 as a pane or a component of a pane for heating a window or for reducing the heating up of an interior space.

* * * * *